United States Patent
Hind et al.

(10) Patent No.: US 7,212,828 B2
(45) Date of Patent: May 1, 2007

(54) MONITORING CHANGEABLE LOCATIONS OF CLIENT DEVICES IN WIRELESS NETWORKS

(75) Inventors: John R. Hind, Raleigh, NC (US); Marcia L. Stockton, Bakersfield, CA (US)

(73) Assignee: International Business Machines Corporation, Armonk, NY (US)

(*) Notice: Subject to any disclaimer, the term of this patent is extended or adjusted under 35 U.S.C. 154(b) by 291 days.

(21) Appl. No.: 10/334,263

(22) Filed: Dec. 31, 2002

(65) Prior Publication Data

US 2004/0203908 A1  Oct. 14, 2004

(51) Int. Cl.
 *H04Q 7/36* (2006.01)
 *G08B 13/14* (2006.01)
 *G08B 23/00* (2006.01)

(52) U.S. Cl. .............. 455/456.1; 455/67.11; 455/411; 340/568.1; 340/573.4

(58) Field of Classification Search ........... 455/404.2, 455/410, 411, 414.2, 456.1–456.6; 340/568.1–570, 340/571–573.4, 539
See application file for complete search history.

(56) References Cited

U.S. PATENT DOCUMENTS

| | | | |
|---|---|---|---|
| 5,583,517 A | 12/1996 | Yokev et al. | |
| 6,414,635 B1 | 7/2002 | Stewart | |
| 6,961,541 B2* | 11/2005 | Overy et al. | 455/41.2 |
| 2001/0016489 A1* | 8/2001 | Haymes et al. | 455/423 |
| 2001/0018349 A1 | 8/2001 | Kinnunen et al. | |
| 2002/0006788 A1* | 1/2002 | Knutsson et al. | 455/422 |
| 2002/0052193 A1* | 5/2002 | Chetty | 455/412 |
| 2003/0232598 A1* | 12/2003 | Aljadeff et al. | 455/41.2 |
| 2004/0053645 A1* | 3/2004 | Brignone et al. | 455/562.1 |
| 2004/0111519 A1* | 6/2004 | Fu et al. | 709/229 |

FOREIGN PATENT DOCUMENTS

| | | |
|---|---|---|
| EP | 992921 A2 * | 4/2000 |
| WO | 0133825 | 5/2001 |
| WO | 0235880 | 10/2001 |
| WO | 02035880 | 5/2002 |
| WO | 02041504 | 5/2002 |

OTHER PUBLICATIONS

Rob Flickenger, *Antenna on the Cheap (er Chip)*, Jul. 5, 2002, O'Reilly Network, Dec. 11, 2002 <http://www.oreillynet.com/lpt/wlg/448>.

(Continued)

*Primary Examiner*—Lester G. Kincaid
*Assistant Examiner*—Matthew C Sams
(74) *Attorney, Agent, or Firm*—Marcia Doubet; Jerry W. Herndon

(57) ABSTRACT

Security of wireless networks is improved by rejecting traffic from a wireless device located outside a defined spatial boundary. The device's spatial position with respect to the boundary is determined using directional antenna arrays on a plurality of measurement points, and calculating where the vectors intersect. Having thus determined a device's location, access to a wireless network can be denied if the device is outside a predetermined spatial boundary. Or, the device's location inside or outside of the spatial boundary can be used for monitoring a changeable location of one or more client devices in a wireless network, for example as a theft detection or theft deterrent mechanism.

16 Claims, 6 Drawing Sheets

OTHER PUBLICATIONS

Robert Lemos, *Wireless networks wide open to hackers*, Jul. 12, 2001, News.Com, Dec. 11, 2002 <http://news.com.com/2100-1001-269853.html?tag=bplst>.

Sandra Kay Miller, *War Driving, Computing mobility opens networks to an invasion of the wireless snatchers.*, Nov. 2001, Information Security Magazine, Dec. 11, 2002 <http://www.infosecuritymag.com/articles/november01/technology_war driving.shtml>.

Frank Keeney, *Vacation War Driving*, Pasadena Networks, Dec. 10, 2002 <http://www.pasadena.net/vacation>.

*Ekahau Positioning Engine™ 2.0*, Ekahau, Inc., Dec. 11, 2002 <http://www.ekahau.com/products/positioningengine/>.

*Indoor Positioning in 802.11b Networks*, Ekahau, Inc., Dec. 11, 2002 <http://www.ekahau.com/products/positioningengine/features.html>.

*The Most Accurate Indoor Positioning*, Ekahau, Inc., Dec. 11, 2002 <http://www.ekahau.com/products/positioningengine/specifications.html/>.

*Configurations and System Requirements*, Ekahau, Inc., Dec. 11, 2002 <http://www.ekahau.com/products/positioningengine/requirements.html>.

*Ekahau Positioning Engine 2.0 Demonstration*, Ekahau, Inc., Dec. 11, 2002 <http://www.ekahau.com/products/positioningengine/demo.html/>.

*New Location Aware Applications*, Ekahau, Inc., Dec. 11, 2002 <http://www.ekahau.com/technology/applications.html>.

'Big Brother Set to Guard a TV Near You', Technology-Reuters, Sep. 10, 2003. 1 page.

"User Location and Tracking in an In-Building Radio Network", by Paramvir Bahl, et al. Microsoft Research, XP-002967194, Technical Report, Feb. 1999.

"Functional Specification of Location Services in UTRAN", XP002216979, Jun. 2000, paragraphs 04.31, 4.5.11.

Bahl P, et al: "User Location and Tracking in an In-Building Radio Network", Technical Report MSR-TR-99-12. Feb. 1999, XP002967194, paragraph 1-3.

"Functional Specification of Location services in UTRAN", Jun. 2000, paragraphs 4.31, 4.5.1. XP002216979.

"Location Awareness in Community Wireless LANs", by Alois Ferscha, et al. www.soft.uni-linz.ac.at/Research/Publications/_Documents/informatik2001.pdf, no month used.

\* cited by examiner

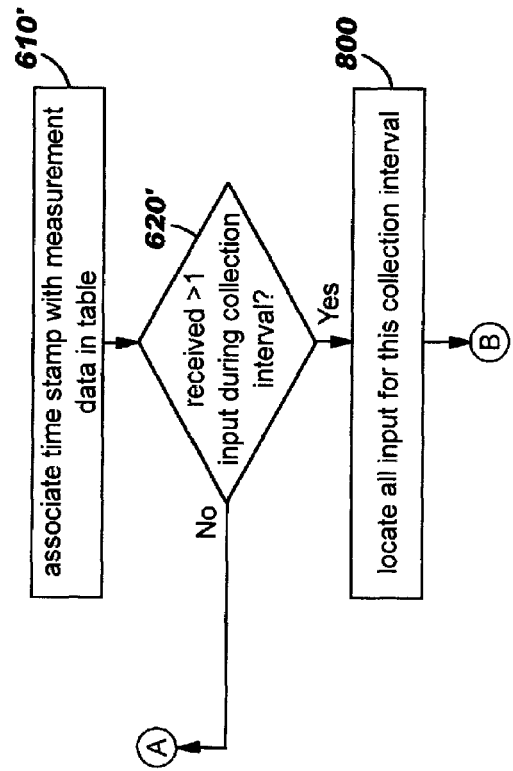

MONITORING CHANGEABLE LOCATIONS OF CLIENT DEVICES IN WIRELESS NETWORKS

RELATED INVENTION

The present invention is related to commonly-assigned U.S. Pat. Ser. No. 10/335,148, filed concurrently herewith, which is entitled "Spatial Boundary Admission Control for Wireless Networks", and which is hereby incorporated herein by reference.

BACKGROUND OF THE INVENTION

1. Field of the Invention

The present invention relates to security of computer networks, and deals more particularly with methods, systems, computer program products, and methods of doing business whereby access to a wireless network is controlled based on a device's presence within a spatial boundary. The disclosed techniques may also be used for determining whether devices remain within a spatial boundary.

2. Description of the Related Art

"WiFi" (for "wireless fidelity") or "Wi-Fi"® is the label commonly applied to devices following the Institute of Electrical and Electronics Engineers ("IEEE") 802.11b specification. This abbreviation is taken from the logo of an industry interoperability group (Wireless Ethernet Compatibility Alliance, Inc., or "WECA", also known as the Wi-Fi Alliance) that certifies compliant products. ("Wi-Fi" is a registered trademark of Wireless Ethernet Compatibility Alliance, Inc.) WiFi technology allows a raw wireless data transmission rate of approximately 11 Mbps at indoor distances from several dozen to several hundred feet, and outdoor distances of several to tens of miles using an unlicensed portion of the 2.4 GHz band in 14 overlapped channels.

While two modes of operation are possible, namely peer-to-peer and network, most WiFi installations use the network form where an "access point" serves as a hub bridging client adapters to one another and to a wired network, often using Network Address Translation ("NAT") technology. See FIG. 1, where this configuration is illustrated. When a client wants to join a network hosted by an access point, it must first synchronize with that network by performing the following synchronization protocol steps. First, to establish initial communications, it either listens for a "beacon" sent periodically by the access point or sends a "probe" and awaits a response. Next, the client undergoes an authentication process with the access point. If that is successful, the client proceeds to an association process which sets up a logical session over which higher-layer protocols and data may flow. At any point thereafter, either the access point or the client may terminate the association, shutting down further data communications. After the association is terminated, no further data communication can occur until the aforementioned synchronization protocol is repeated to join the network anew.

The world of WiFi is no longer confined to expensive-gadget-happy geeks, but is being embraced by everyday people who love the convenience of being mobile. Mass production has made access points and client adapters so inexpensive that WiFi is being widely used for networking in many places, including homes and small offices, replacing the high-cost special wiring of the past and allowing folks to easily move their computing workspace on a moment-to-moment whim. As the majority of users purchasing commodity-priced WiFi gear are non-technical, they have no insight to the underlying technology nor do they understand the side effects of its use.

Unfortunately, WiFi has also attracted the hacker fringe, who view its deployment as an invitation to steal access to the Internet and/or locally-available services. The poor security which has been identified in WiFi's standard protocols (see, for example, "Wireless networks wide open to hackers" by Robert Lemos, which may be found on the Internet at http://news.com.com/2100-1001-269853.html?tag=bplst ), coupled with cheap ways to intercept the radio signals miles outside the nominal 300 foot service radius (see "Antenna on the Cheap" by Rob Flickenger, located on the Internet at http://www.oreillynet.com/cs/weblog/view/wlg/448) has opened the barn door to even the lowly budget-strapped high school "script kiddy". With this trend, new terms for wireless hacking have emerged, such as "War Driving" and "Warchalking". War driving is the activity of locating WiFi networks that can easily be tapped from a laptop in a car. (See "WAR DRIVING" by Sandra Kay Miller, located on the Internet at http://www.infosecuritymag.com/articles/november01/technology_wardriving.shtml, for an article on this topic.). Warchalking is the practice of marking the presence of WiFi networks (for example, on the side of a building where a WiFi network is detected by a "war driver", or on the sidewalk in front of the building) so they are easy to locate without a device such as the $6.45 "Pringles" can antenna (described in the above-mentioned "Antenna on the Cheap" article) used by the war drivers.

What is needed is a way of improving security in WiFi networks to prevent intrusion by unauthorized devices. The solution must be easy to set up, even in a home environment, and must not require changes to the WiFi standards or to existing client device adapters.

SUMMARY OF THE INVENTION

An object of the present invention is to improve security in WiFi networks.

Another object of the present invention is to provide security improvements for WiFi networks by establishing a spatial boundary around a WiFi network and rejecting network traffic from devices outside the boundary.

A further object of the present invention is to provide improvements to WiFi networks that are easy to set up, even in a home environment, and that do not require changes to the WiFi standards or to existing client device adapters.

Another object of the present invention is to provide techniques for monitoring a changeable location of one or more client devices in a wireless network.

A further object of the present invention is to provide techniques for deterring and/or detecting theft of wireless devices.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for monitoring a changeable location of one or more client devices in a wireless network. In a preferred embodiment, this technique comprises: receiving, at a first device on the WLAN, measurement data from a plurality of measurement points on the WLAN, wherein the measurement data for each measurement point comprises a reading for a particular client device, the reading observed by a plurality of antenna elements of the measurement point, the antenna elements being capable of determining an angle to a source of radio transmission; computing, by the first device, a current location of the particular client device using the received measurement data; and determining, by the first device, whether the current location of the particular client device is within a predetermined spatial boundary.

This embodiment may further comprise allowing the particular client device to access the WLAN only if its current location is determined to be within the predetermined spatial boundary; deactivating one or more functions of the particular client device if its current location is determined not to be within the predetermined spatial boundary; and/or activating an alarm if the current location of the particular client device is determined not to be within the predetermined spatial boundary. The first device may periodically transmit a cryptographic key from the first device to the particular client device, the cryptographic key being required to unlock at least one of the functions of the particular client device, in which case the deactivation preferably further comprises ceasing the transmission when the current location of the particular client device is determined not to be within the predetermined spatial boundary.

An enumeration may be maintained of a plurality of client devices that should be present in the WLAN, in which case an alarm may be activated and/or one or more functions may be deactivated if the current location of any of the client devices is determined not to be within the predetermined spatial boundary.

The first device preferably learns the predetermined spatial boundary at set-up time, where this preferably comprises: moving a training client device around a spatial boundary while the training client device communicates with a set-up application in the first device; recording, by the set-up application, successive locations of the training client device from these communications; and using, by the set-up application, the successive locations to define the predetermined spatial boundary.

The present invention may also be provided as methods of doing business, whereby a service is offered to clients for determining whether their wireless devices are within, or remain within, a particular spatial boundary. This service may be provided under various revenue models, such as pay-per-use billing, monthly or other periodic billing, and so forth.

The present invention will now be described with reference to the following drawings, in which like reference numbers denote the same element throughout.

BRIEF DESCRIPTION OF THE DRAWINGS

FIGS. 4, 6, and 8 provide flowcharts depicting logic that may be used to implement preferred embodiments of the present invention;

FIG. 7 shows an example of a data structure that may be used at the base station to store measurements from the various measurement points, for a plurality of client devices.

DESCRIPTION OF PREFERRED EMBODIMENTS

Figure 1:
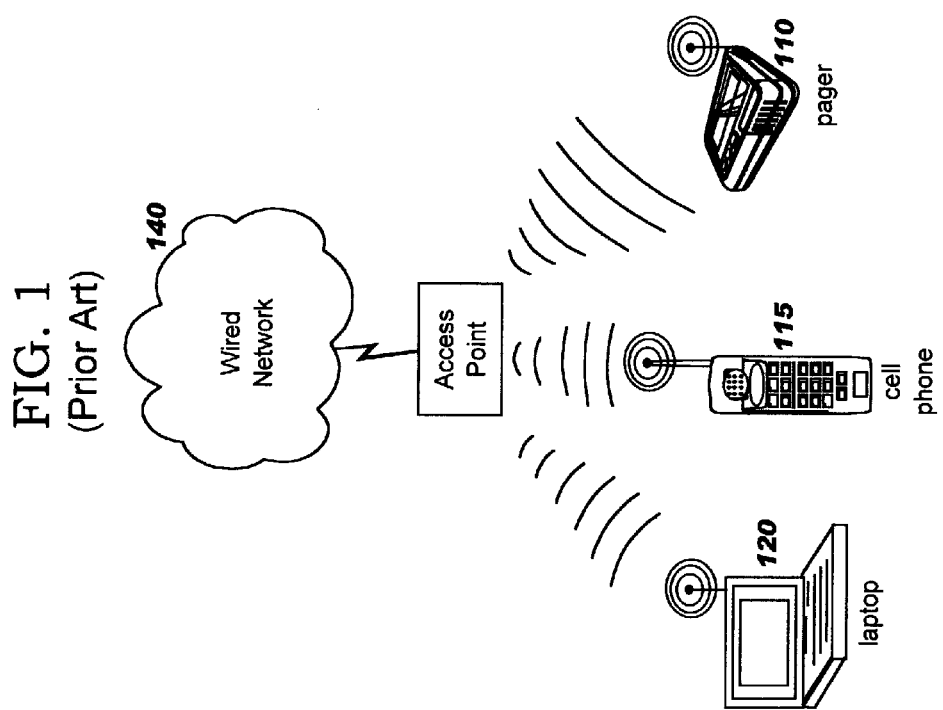
FIG. 1 depicts devices in a simple wireless network configuration, according to the prior art.

Security of wireless networks is improved by rejecting traffic from a wireless device located outside a defined spatial boundary. The device's spatial position with respect to the boundary is determined using multiple directional antenna arrays and calculating where the vectors intersect. Problems of prior art approaches are solved by the present invention, which provides a novel application of existing technologies.

Most client adapters in existing devices use omni-directional antennas. However, in addition to the significant attenuation of the radio signal as it passes through intervening objects like walls and furniture, these so-called omni-directional antennas exhibit significant variations in gain patterns, i.e., they are not really omni-directional. Thus, the signal strength seen at a receiver is of no use in determining the distance to the transmitter.

The present invention overcomes problems of the prior art using a modified WiFi access point (also called a "base station") and at least two remote wireless sensors, all participating in the WiFi network to be protected, and preferably deployed in an equilateral triangle configuration. See FIG. 2. These devices are referred to herein as "measurement points". Each measurement point is equipped with a directional antenna capable of determining the angle to the source of radio transmissions. By intersecting the directional vectors measured at each measurement point, the present invention determines the spatial position of devices attempting to access the network, and classifies them as being inside or outside a defined boundary. See FIG. 3. Devices inside the boundary are allowed to connect to the network (assuming, of course, that the previously-discussed synchronization protocol completes successfully), while devices outside the boundary are not.

Preferred embodiments of the present invention use an antenna array at each measurement point to determine the angular direction of the client's transmission. An "antenna array" is any prior-art arrangement of antenna elements capable of discerning the directionality of a radio signal. (That is, the measurement point's directional antenna may be a single antenna comprised of multiple antenna elements in an array, or a plurality of antennas that are individually not directional but which are directional when used together as an array.) in simple wireless networks such as a single-occupant house or an office building, two-element arrays at each measurement point may suffice to define a 2-dimensional boundary. For more complex arrangements where a 3-dimensional spatial boundary is needed, each measurement point can employ a multiple-element array to measure the angle of the received signals in 3 dimensions.

The base station, upon receiving angular readings from each measurement point for a given association (i.e., for a given client session with the base station), computes the client's position with respect to a defined boundary. If this position falls outside the defined boundary, the base station terminates the association, forcing the client to re-authenticate before it can receive or send layer three data. This process is described in more detail below, with reference to FIG. 6.

Each measurement point is equipped with an antenna array that intercepts radio transmissions from client devices.

Figure 4:
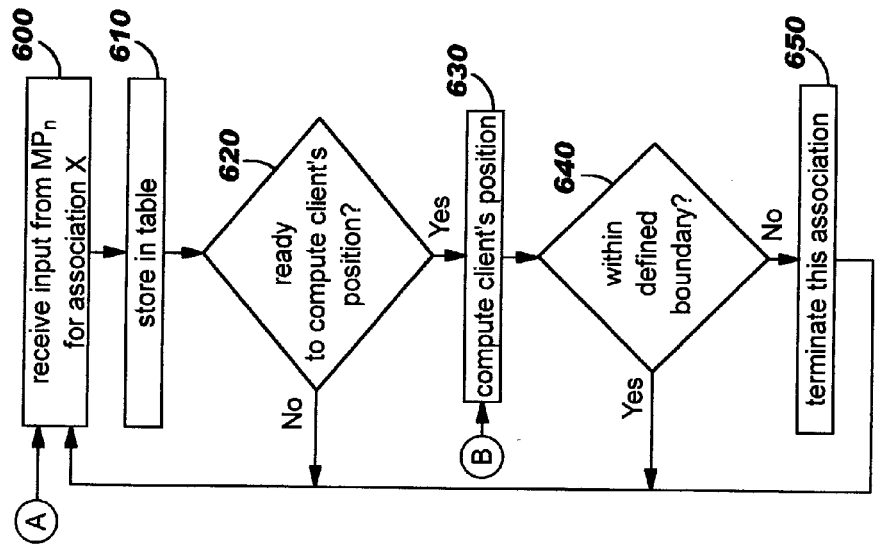

The processing of a client transmission at a measurement point is illustrated by logic in FIG. 4. Upon detecting a transmission (Block 400), the measurement point preferably measures the angular relationship between the signal source and the antenna array (Block 410), decodes the WiFi packet to extract the client association identifier (Block 420), locates an appropriate slot in a buffer corresponding to the association (Block 430), and saves the angular value in that slot (Block 440). The angular relationship may be determined using suitable prior art techniques such as phase angle, which may be implemented using a digital signal processor or other suitable hardware/software combination.

To prevent excessive communications overhead between the base station and the other measurement points and to reduce the base station's processing load, the measurement points preferably collect, sort, and reduce instantaneous readings over a short period, say a few seconds. For every unique association seen in client transmissions, the measurement point then reports a single, most-recent angle for this association to the base station. This reporting process is illustrated in FIG. 4, where Block 450 tests to see if the reporting is triggered. (For example, when a timer is used to measure the preferably-short reporting period, Block 450 comprises determining whether the timer has popped.) If so, then the measurement point transmits saved values for one or more associations to the base station (Block 460). Alternatively, the processing of Blocks 450 and 460 may be separated from the processing of Blocks 400-440. (For example, a separate thread may be used for implementing the reporting.) In this case, the reporting may occur independently of receiving a client transmission.

Figure 5:
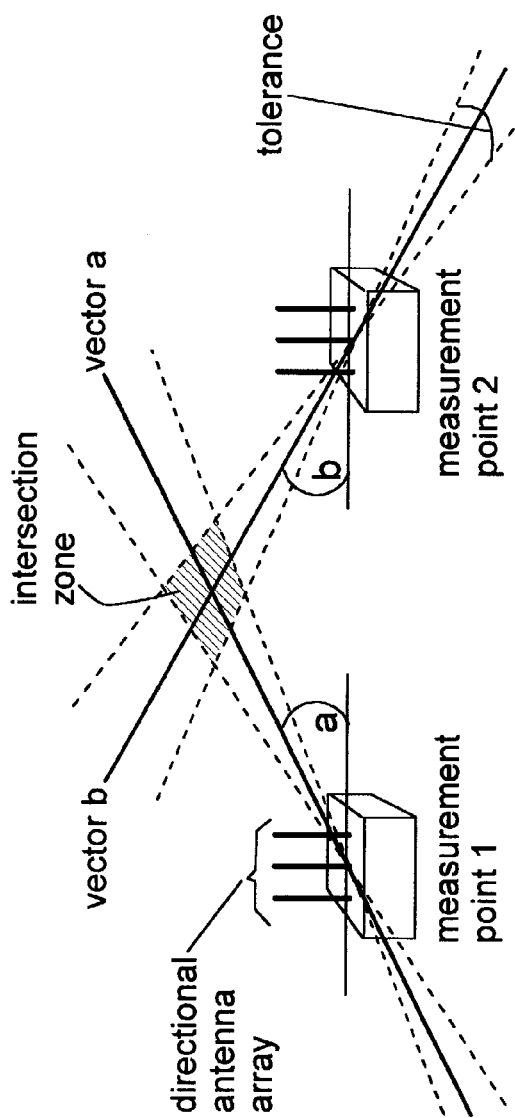
FIG. 5 illustrates how angular measurements at two measurement points may suffice to narrow the spatial position of a transmission source to an intersection zone, according to preferred embodiments of the present invention.

The diagram in FIG. 5 depicts how angular measurements at two measurement points may suffice to narrow the spatial position of a transmission source to an intersection zone. Depending on the type of antenna array employed, it may not be possible to know the precise angle. The phase angle method in preferred embodiments of the present invention can determine a vector (e.g., vector $\alpha$), where the transmitter could be located at $\alpha$ degrees +/- some tolerance, with respect to an individual antenna array. (Depending on the antenna array in use, the phase angle method might only be able to determine that the transmitter is either at $\alpha$ degrees, plus or minus some tolerance, or at $\alpha+180$ degrees, plus or minus the same tolerance.) The intersection of these vectors from the two measurement points forms an "intersection zone", where this intersection zone indicates the transmitter's approximate position in a 2-dimensional space.

Figure 2:
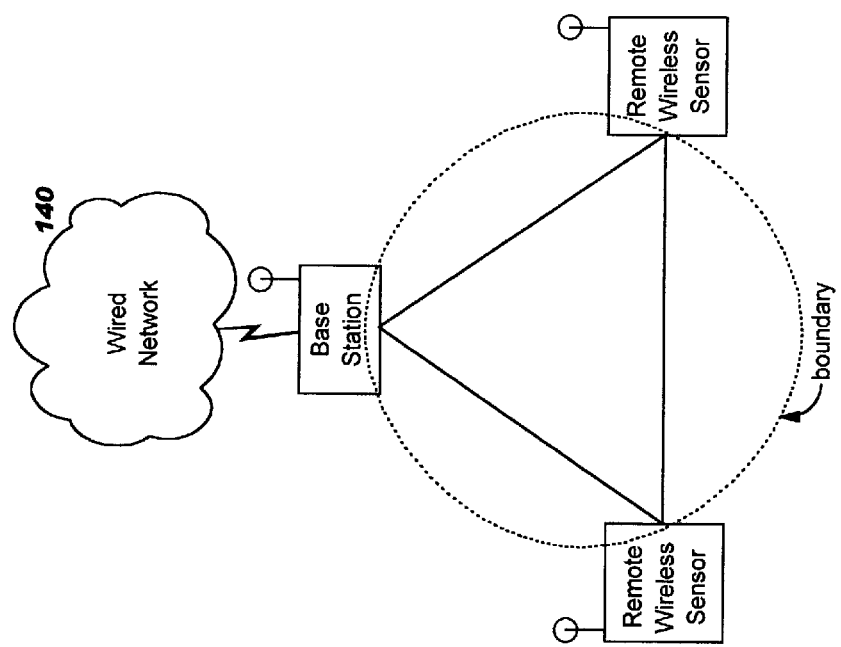
FIG. 2 illustrates a plurality of remote wireless sensors and a base station, also referred to herein as "measurement points", deployed in a wireless network for determining a client device's location according to preferred embodiments of the present invention.
Figure 3:
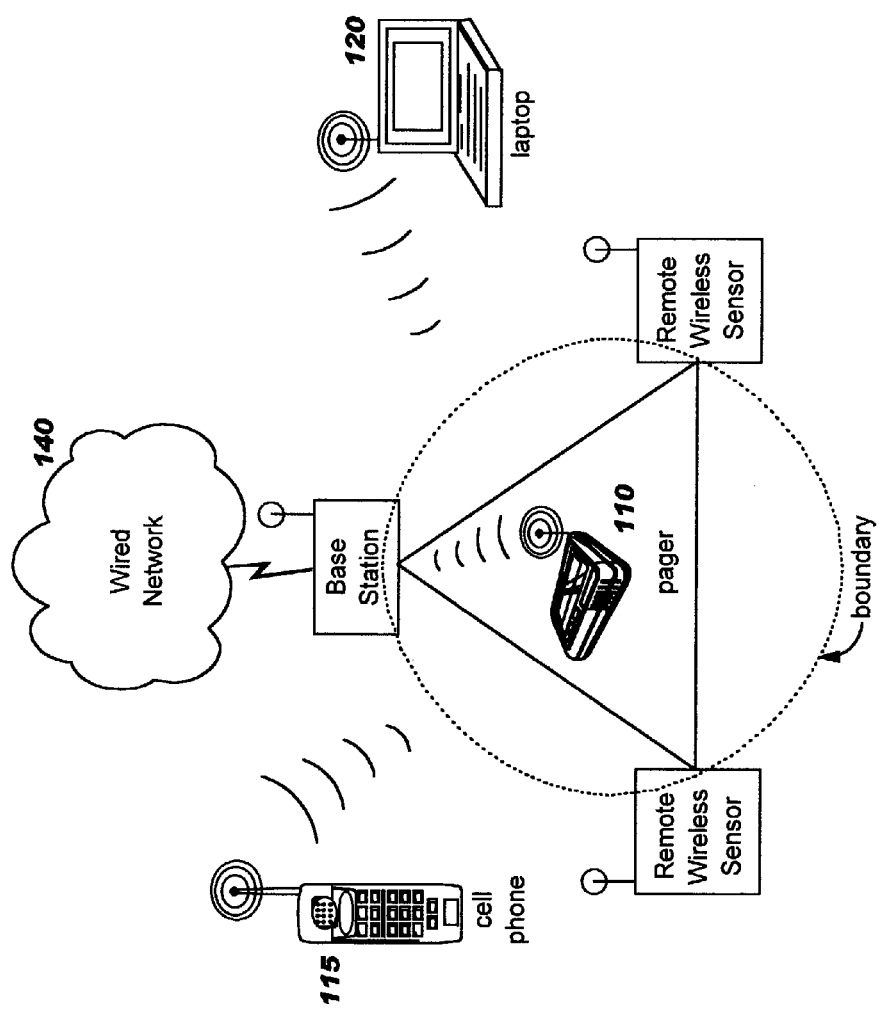
FIG. 3 shows several client devices that may attempt to access the wireless network of FIG. 2.

To define a 2-dimensional planar boundary, e.g., using 3 measurement points, ideally the measurement points are positioned in an equilateral triangle with vertices near the defined boundary. FIGS. 2 and 3 illustrate a circular boundary using dotted line. In this example, the cell phone 115 and laptop 120 devices would be prevented from accessing the network, since they are outside the spatial boundary, but the pager 110 device would be allowed access. Preferably, each measurement point's antenna array is oriented approximately 60 degrees from the other two measurement point's antenna arrays.

With less-than-ideal arrangements, the spatial tolerance becomes less precise. The tolerance will vary with the angle to an antenna array and between the devices. In preferred embodiments, each measurement point reports its observed angles as if they are perfect, i.e., having a zero tolerance; however, each measured angle is affected by the tolerance (i.e., variance) of its antenna. In a typical implementation using mass-marketed antennas, the tolerance angle is likely a function of the type of antenna array, and thus may be defined as a constant or configurable value to be used by the base station when computing client positions. Alternatively, an implementation may allow for the measurement points to transmit their tolerance angle to the base station, if it is known. It should be noted that the tolerance angle need not be uniform among measurement points. Instead, each measurement point simply needs a tolerance angle that is reasonable, i.e., not too large, and that is known by or available to the base station.

To determine the transmitter's position in a 3-dimensional space (e.g., a suite within an office building), preferred embodiments use three measurement points and intersect three vectors. A larger number of measurement points can be used, if desired.

The remote measurement points are themselves WiFi clients and at regular short intervals transmit their measurement data (a list of association, angle pairs) to the base station. There are numerous ways to encode and to synchronize the transmissions from the remote measurement points, and the scope of the present invention is not limited by choice of a particular approach. One approach that may be used will now be described with reference to logic in FIG. 6.

On receiving measurement data from a remote measurement point (Block 600), the base station stores this data in a table or similar data structure (Block 610). Recall that, in preferred embodiments, the base station itself hosts an additional measurement point, and thus locally-received input (which may be processed by the base station, in its role as a measurement point, using logic in FIG. 4) is also stored in this table. (Alternatively, an additional remote measurement point might replace the base station in its role of observing and reporting device locations, without deviating from the scope of the present invention.) Preferably, the rows of the table correspond to client associations observed during a measurement interval. The first column contains the association identifier. Additional columns correspond to each measurement point. See FIG. 7, where a sample table is illustrated. In this sample table 700, the association identifier is stored in column 705, the data observed by the base station itself is stored in column 710, and data reported by two remote measurement points ("MP1" and "MP2") is stored in columns 715 and 720, respectively. Additional columns may be added for implementations using more than three measurement points.

Figure 6:
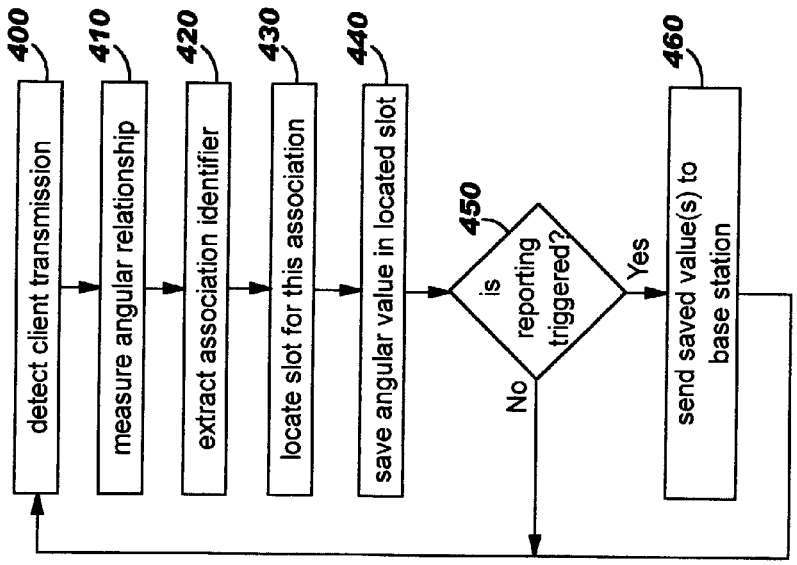

Returning to the discussion of FIG. 6, the base station checks (Block 620) to see if it is time to process the table entries. If not, control returns to Block 600 to await input from another measurement point. Otherwise, Block 630 processes this table to determine each client's position. Block 640 compares the client position to the defined boundary, and if the client is outside the boundary, this association is terminated (Block 650). In either case, control preferably returns to Block 600.

In one aspect, the test in Block 620 is timer-driven. For example, a collection interval may be defined, and the table entries that have been collected during this interval are then processed when the collection interval expires. One way in which this aspect may be implemented is illustrated by logic in FIG. 8. Upon receipt of data from a measurement point, a time stamp is preferably associated with the data as it is recorded in an augmented version of the table of FIG. 7 (Block 610'). This time stamp may be the arrival time at the base station, or in alternative implementations it may be a time stamp reported by the measurement point. (In the latter case, a reliable clock-synchronizing algorithm is preferably used to synchronize the clocks of the various measurement points. Clock-synchronizing algorithms are known in the art, and do not form part of the inventive concepts of the present invention.)

Block 620' comprises checking to see if more than one measurement point (including the base station) has reported data during the current collection interval. The collection interval is preferably a predefined constant (or a configurable parameter), and should be small enough so that if a client is mobile (e.g., in a car or being carried by a person), it cannot have travelled very far during the interval. The collection interval should also be greater than or equal to the reporting interval used by the measurement points, so that if the measurement points report at different times, data from multiple measurement points will be available within a single collection interval. Thus, if the test in Block 620' has a negative result, control returns to Block 600 of FIG. 6 to await measurements from other measurement points within this collection interval. When data is available from multiple measurement points for this collection interval, on the other hand, Block 800 locates all such data (and may remove stale entries from the table, or may simply discard any measurements that fall outside the current interval), and this data is used in Block 630 of FIG. 6 when computing the client's position.

In another aspect, the test in Block 620 and the subsequent table-processing logic may be separated from the receipt of measurement data in Block 600, such that the determination of whether the table should be processed is independent of receiving new input data. In one approach within this aspect, the test in Block 620 has a positive result upon expiration of a timer (which preferably coincides with the collection interval). As another approach, a continuous looping process may be used. In this case, the test in Block 620 has a positive result when a measurement point has reported new data (and at least one other measurement is available).

In a further aspect, a demand-driven protocol may be used, whereby the base station periodically polls the measurement points for their input on a particular association. The logic in FIG. 6 may then be used for processing the responses from the measurement points. In this aspect, the test in Block 620 preferably comprises determining whether each polled measurement point has reported its data.

A key advantage of the present invention is ease of setup. When deploying the system, there is no need to precisely position the measurement points. They are simply placed at approximately equal angles near the defined boundary, with each measurement point's directional antenna aimed toward the center of the protected area. Setup can be accomplished with very simple instructions that almost anyone can follow, even if they have very little (or no) technical expertise.

Preferably, the defined boundary is learned at set-up time by carrying a client device around the intended boundary while communicating with a set-up application in the base station. With the remote reporting interval having been set to a very small value, the base station learns the angular coordinates of the boundary with respect to the measurement points, but need not know the actual dimensions involved (since it does not know the scale of distance involved). Setting the reporting interval to a larger or smaller value (and/or altering the speed of movement of the client device) during this set-up process allows a base station to learn a boundary at a different level of granularity.

Prior art software approaches are known which attempt to use relative signal strength triangulation to locate wireless local area network ("WLAN") clients. As one example, the Positioning Engine from Ekahau, Inc. is a commercially-available product that may be used for tracking device locations in a WLAN. While this product offers a number of advantages, because of signal attenuation and device transmission characteristics, extensive mapping of the entire area of coverage may be needed to produce highly-accurate results. (Accurate results require using client adapters whose relative characteristics to the device used in the mapping are known. That is, the transmitted power or effective radiated power from the attached or built-in antenna, at various angles, must be known, since this approach relies on signal strength.) This approach also needs multiple full-wired access points (at least three), and changing the content of the area monitored (for example, moving furniture around) requires a recalibration. For each interior mapped point, location coordinates are needed to pair with the signal strength readings.

The present invention uses a different approach, as described in detail above. It does not rely on signal strength and hence on client adapter/antenna characteristics. The present invention is not impacted by the content (e.g., furniture, walls, books, etc.) of the monitored area or changes to that content. The training process used in preferred embodiments comprises simply walking the boundary, without needing to tell the system where the moving device is at each measurement. The remote sensing device uses the WLAN to report readings, and therefore does not need multiple access points.

The present invention has been described with reference to its use in determining whether mobile devices are inside or outside a spatial boundary. However, this is for purposes of illustration and not of limitation. The inventive techniques described herein may be used for devices that are stationary devices as well (including a mobile device that has become stationary). The present invention may also be used to ensure that one or more devices remain within a defined spatial boundary. For example, a theft-prevention system may be implemented in an office setting, retail store, warehouse, etc. using techniques disclosed herein. Suppose that an electronics store wishes to prevent thefts of relatively-expensive wireless gadgets. The devices can be defined as participants in a WLAN. An enumerated list of these devices can be created, and a system using techniques disclosed herein can then test for the devices on this list remaining within the defined boundary (e.g., the showroom and/or stockroom). If a device that is supposed to be within the store moves outside the boundary, instead of rejecting its participation in the wireless network (as described above with reference to Blocks 640 and 650 of FIG. 6), the base station might activate an audible alarm or perhaps send a signal to the device to cause it to sound its own alarm, flash lights, etc. Similarly, the continued presence of wireless devices at a museum, trade show, hotel, office, or other business location can be monitored in the same manner. Guests can therefore use the devices while visiting the premises, but are effectively discouraged from removing the devices from that location.

Another application of the disclosed techniques is to disable the functionality of a wireless device if the device crosses a defined boundary. For example, a cryptographic key might be transmitted from the base station to a wireless device periodically, allowing the device to "unlock" its software and render that software usable. If the device moves outside the boundary, the base station ceases transmitting the key. The device may then continue to work from an electrical standpoint, but the absence of the key causes the software to just stop working.

These and other applications are within the scope of the present invention.

The present invention may be provided as method(s) of doing business. For example, a business entity may provide a service that monitors the location of devices using techniques disclosed herein. This service may be provided under various revenue models, such as pay-per-use billing, monthly or other periodic billing, and so forth.

While preferred embodiments have been described with reference to radio-based wireless (i.e., WiFi or 802.11b) networks, this is for purposes of illustration but not of limitation; the disclosed techniques may be applied to other types of wireless networks as well.

As will be appreciated by one of skill in the art, embodiments of the present invention may be provided as methods, systems, or computer program products. Accordingly, the present invention may take the form of an entirely hardware embodiment, an entirely software embodiment (augmented by the antennas and measurement point devices and adapters), or an embodiment combining software and hardware aspects, Furthermore, the present invention may be embodied in a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions (which execute via the processor of the computer or other programmable data processing apparatus) create means for implementing the functions specified in the flowchart and/or block diagram block or blocks.

These computer program instructions may also be stored in one or more computer-readable memories, where each such memory can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto one or more computers or other programmable data processing apparatus to cause a series of operational steps to be performed on the computers or other programmable apparatus to produce, on each such device, a computer implemented process such that the instructions which execute on the device provide steps for implementing the functions specified in the flowchart and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include the preferred embodiments and all such variations and modifications as fall within the spirit and scope of the invention.

What is claimed is:

1. A computer-implemented method of ensuring that client devices remain inside a defined spatial boundary, comprising steps of:
    identifying a plurality of client devices that are to remain inside a defined spatial boundary, each of the client devices participating in a wireless local area network ("WLAN") with which the defined spatial boundary is associated; and
    monitoring whether each of the client devices remains inside the defined spatial boundary, wherein the monitoring step further comprises, for each of the client devices, the steps of:
        receiving, at a first device on the WLAN, measurement data from a plurality of measurement points on the WLAN, wherein the measurement data for each measurement point comprises a reading indicating an angle of radio transmission observed upon a transmission by the client device, the angle observed by a plurality of antenna elements of the measurement point, the antenna elements being capable of determining an angle to a source of radio transmission;
        computing, by the first device, a current location of the client device using the received measurement data;
        comparing, by the first device, the computed location of the client device to the defined spatial boundary to determine whether the client device remains inside the defined spatial boundary; and
        triggering, by the first device, an out-of-boundary action for the client device if the comparing step determines that the client device does not remain inside the defined spatial boundary;
    wherein the defined spatial boundary is dynamically defined at set-up time, the dynamic defining further comprising steps of:
        physically moving a training client device near selected ones of measurement points on the WLAN while the training client device repeatedly transmits to a set-up application in the first device and while the first device repeatedly receives boundary measurement data from the selected ones of the measurement points, wherein the boundary measurement data received from each selected measurement point comprises a boundary reading indicating the angle of radio transmission observed by the selected measurement point upon the transmission by the moving training client device as it transmits to the set-up application in the first device;
        computing, by The first device, successive locations of the moving training client device using the received boundary measurement data; and
        using, by the set-up application, the successive locations to dynamically define the spatial boundary.

2. The method according to claim 1, further comprising the step of allowing each of the client devices to access the WLAN only while the comparing step determines that the client device remains inside the defined spatial boundary.

3. The method according to claim 1, wherein the out-of-boundary action comprises deactivating at least one function of each client device for which the out-of-boundary action is triggered.

4. The method according to claim 1 wherein the first device periodically transmits a cryptographic key from the first device to each of the client devices, the cryptographic key being required to unlock at least one of the functions of each of the client devices, and wherein the out-of-boundary action further comprises the step of ceasing the transmission to each of the client devices for which the comparing step determines that the client device does not remain inside the defined spatial boundary, thereby preventing access to the at least one function of that client device for which the cryptographic key is required for unlocking.

5. The method according to claim 1, wherein the out-of-boundary action comprises activating an alarm.

6. A system for ensuring that client devices remain inside a defined spatial boundary, comprising:
   a plurality of client devices that are to remain inside a defined spatial boundary, each of the client devices participating in a wireless local area network ("WLAN") with which the defined spatial boundary is associated; and
   means for monitoring whether each of the client devices remains inside the defined spatial boundary, wherein the means for monitoring, for each of the client devices, further comprises:
      means for receiving, at a first device an the WLAN, measurement data from a plurality of measurement points on the WLAN, wherein the measurement data for each measurement point comprises a reading indicating an angle of radio transmission observed upon a transmission by the client device, the angle observed by a plurality of antenna elements of the measurement point, the antenna elements being capable of determining an angle to a source of radio transmission;
      means for computing, by the first device, a current location of the client device using the received measurement data;
      means for comparing, by the first device, the computed location of the client device to the defined spatial boundary to determine whether the client device remains inside the defined spatial boundary; and
      means for triggering, by the first device, an out-of-boundary action for the client device if the means for comparing determines that the client device does not remain inside the defined spatial boundary;
   wherein the defined spatial boundary is dynamically defined at set-up time, the dynamic defining further comprising:
      physically moving a training client device near selected ones of the measurement points an the WLAN while the training client device repeatedly transmits to a set-up application in the first device and while the first device repeatedly receives boundary measurement data from the selected ones of the measurement points, wherein the boundary measurement data received from each selected measurement point comprises a boundary reading indicating the angle of radio transmission observed by the selected measurement point upon the transmission by the moving training client device as it transmits to the set-up application in the first device;
      means for computing by the first device, successive locations of the moving training client device using the received boundary measurement data; and
      means for using, by the set-up application, the successive locations to dynamically define the spatial boundary.

7. The system according to claim 6, further comprising means for allowing each of the client devices to access the WLAN only while the means for comparing determines that the client device remains inside the defined spatial boundary.

8. The system according to claim 6, wherein the out-of-boundary action comprises deactivating at least one function of each client device for which the out-of-boundary action is triggered.

9. The system according to claim 6, wherein the first device periodically transmits a cryptographic key from the first device to each of the client devices, the cryptographic key being required to unlock at least one of the functions of each of the client devices, and wherein the out-of-boundary action further comprises ceasing the transmission to each of the client devices for which the means for comparing determines that the client device does not remain inside the defined spatial boundary, thereby preventing access to the at least one function of that client device for which the cryptographic key is required for unlocking.

10. The system according to claim 6, wherein the out-of-boundary action comprises activating an alarm.

11. A computer program product for ensuring that client devices remain inside a defined spatial boundary, the computer program product embodied on one or more computer readable media readable by a computing system in a computing environment and comprising:
   computer-readable program code for identifying a plurality of client devices that are to remain inside a defined spatial boundary, each of the client devices participating in a wireless local area network ("WLAN") with which the defined spatial boundary is associated; and
   computer-readable program code for monitoring whether each of the client devices remains inside the defined spatial boundary, wherein the computer-readable program code for monitoring, for each of the client devices, further comprises
      computer-readable program code for receiving, at a first device on the WLAN, measurement data from a plurality of measurement points on the WLAN; wherein the measurement data for each measurement point comprises a reading indicating an angle of radio transmission observed upon a transmission by the client device, the angle observed by a plurality of antenna elements of the measurement point, the antenna elements being capable of determining an angle to a source of radio transmission;
      computer-readable program code for computing, by the first device, a current location of the client device using the received measurement data;
      computer-readable program code for comparing by the first device, the computed location of the client device to the defined spatial boundary to determine whether the client device remains inside the defined spatial boundary: and
      computer-readable program code for triggering, by the first device, an out-of-boundary action for the client device if the computer-readable program code for comparing determines that the client device does not remain inside the defined spatial boundary;
   wherein the defined spatial boundary defined at set-up time, the dynamic defining further comprising:
      physically moving a training client device near selected ones of the measurement points on the WLAN while the training client device repeatedly transmits to a set-up application in the first device and while the first device repeatedly receives boundary measurement data from the selected ones of the measurement points, wherein the boundary measurement data received from each selected measurement point comprises a boundary reading indicating the angle of radio transmission observed by the selected measurement point upon the transmission by the moving training client device as it transmits to the set-up application in the first device;

computing, by the first device, successive locations of the moving training client device using the received boundary measurement data; and using, by the set-up application, the successive locations to dynamically define the spatial boundary.

12. The computer program product according to claim 11, further comprising computer-readable program code for allowing each of the client devices to access the WLAN only while the computer-readable program code for comparing determines that the client device remains inside the defined spatail boundary.

13. The computer program product according to claim 11, wherein the out-of-boundary action comprises deactivating at least one function of each client device for which the out-of-boundary action is triggered.

14. The computer program product according to claim 11, wherein the first device periodically transmits a cryptographic key from the first device to each of the client devices, the cryptographic key being required to unlock at least one of the functions of each of the client devices, and wherein the out-of-boundary action further comprises ceasing the transmission to each of the client devices for which the computer-readable program code for comparing determines that the client device does not remain inside the defined spatial boundary, thereby preventing access to the at least one function of that client device for which the cryptographic key is required for unlocking.

15. The computer program product according to claim 11, wherein the out-of-boundary action comprises activating an alarm.

16. A computer-implemented method of ensuring that client devices remain inside a defined spatial boundary, comprising steps of:

identifying a plurality of client devices that are to remain inside a defined spatial boundary, each of the client devices participating in a wireless local area network ("WLAN") with which the defined spatial boundary is associated;

monitoring whether each of the client devices remains inside the defined spatial boundary, wherein the monitoring step, for each of the client devices, further comprises steps of:

receiving, at a first device on the WLAN, measurement data from a plurality of measurement points on the WLAN, wherein the measurement data for each measurement point comprises a reading indicating an angle of radio transmission observed upon a transmission by the client devices, the angle observed by a plurality of antenna elements of the measurement point, the antenna elements being capable of determining an angle to a source of radio transmission;

computing, by the first device, a current location of the client device using the received measurement data; and determining, by the first device using the computed location of the client device, whether the client device remains inside the defined spatial boundary, the defined spatial boundary having been dynamically defined set-up time, the dynamic defining further comprising steps of:

physically moving a training client device near selected ones of the measurement points on the WLAN while the training client device repeatedly transmits to a set-up application in the first device and while the first device repeatedly receives boundary measurement data from the selected ones of the measurement points, wherein the boundary measurement data received from each selected measurement point comprises a boundary reading indicating the angle of radio transmission observed by the selected measurement point upon the transmission by the moving training client device as it transmits to the set-up application in the first device;

computing, by the first device, successive locations of the moving training client device using the received boundary measurement data; and using, by the set-up application, the successive locations to dynamically define the spatial boundary; and if the monitoring step determines that any of the client devices does not remain inside the defined spatial boundary, performing at least one of (1) deactivating at least function of such devices and (2) activating an alarm; and charging a fee for carrying out the monitoring step.

* * * * *